US010227088B2

(12) United States Patent
Bourdrez et al.

(10) Patent No.: US 10,227,088 B2
(45) Date of Patent: Mar. 12, 2019

(54) DETECTION METHOD OF A STEERING REVERSAL BY MONITORING OF THE TORQUE PROVIDED BY A STEERING ASSIST MOTOR AND APPLICATION OF SAID METHOD FOR EVALUATING THE FRICTION

(71) Applicant: JTEKT EUROPE, Irigny (FR)

(72) Inventors: Sébastien Bourdrez, Yzeron (FR); Pascal Moulaire, La Tour de Salvagny (FR); Christophe Ravier, Saint Pierre de Chandieu (FR)

(73) Assignee: JTEKT EUROPE, Irigny (FR)

( * ) Notice: Subject to any disclaimer, the term of this patent is extended or adjusted under 35 U.S.C. 154(b) by 7 days.

(21) Appl. No.: 15/123,914

(22) PCT Filed: Feb. 27, 2015

(86) PCT No.: PCT/FR2015/050473
§ 371 (c)(1),
(2) Date: Sep. 6, 2016

(87) PCT Pub. No.: WO2015/132509
PCT Pub. Date: Sep. 11, 2015

(65) Prior Publication Data
US 2017/0015350 A1    Jan. 19, 2017

(30) Foreign Application Priority Data

Mar. 3, 2014    (FR) ...................................... 14 51682

(51) Int. Cl.
*B62D 6/10* (2006.01)
*B62D 6/08* (2006.01)
*B62D 5/04* (2006.01)

(52) U.S. Cl.
CPC ............. *B62D 6/10* (2013.01); *B62D 5/0463* (2013.01); *B62D 5/0481* (2013.01); *B62D 6/08* (2013.01)

(58) Field of Classification Search
CPC .......... B62D 6/08; B62D 6/10; B62D 5/0463; B62D 5/0481
See application file for complete search history.

(56) References Cited

U.S. PATENT DOCUMENTS

| 4,509,611 A * | 4/1985 | Kade et al. ............. B62D 6/10 180/446 |
| 2007/0205040 A1* | 9/2007 | Miyasaka et al. ... B62D 5/0481 180/444 |

(Continued)

FOREIGN PATENT DOCUMENTS

| DE | 199 20 975 A1 | 4/2000 |
| EP | 2279927 A2 | 2/2011 |

(Continued)

OTHER PUBLICATIONS

May 6, 2015 International Search Report issued in International Patent Application No. PCT/FR2015/050473.

(Continued)

*Primary Examiner* — Dale W Hilgendorf
(74) *Attorney, Agent, or Firm* — Oliff PLC (57) ABSTRACT

A method for managing a power steering system, including a step (a) of detecting a reversal in the steering direction which involves acquiring a signal, referred to as a "motor torque signal" ($C_{Mot}$), representative of the assistance force ($C_{assist}$) delivered by the power steering motor, then evaluating the time derivative ($\delta C_{Mot}/\delta t$) of the motor torque signal, then comparing the time derivative of the motor torque signal to a predefined variation threshold ($S_{pic}$) in order to detect a derivative peak, greater than the variation threshold ($S_{pic}$), that indicates a reversal in the steering (Continued)

direction. The method next includes a friction evaluation step (b) which involves evaluating the friction from the drop, during the reversal in the steering direction, in a so-called "actuation force signal" ($C_{action}$), which is representative of the total actuation force exerted together on the power steering by the driver and by the power steering motor.

10 Claims, 1 Drawing Sheet

(56) References Cited

U.S. PATENT DOCUMENTS

| | | |
|---|---|---|
| 2011/0098887 A1 | 4/2011 | Fujimoto |
| 2012/0259512 A1 | 10/2012 | Okada et al. |
| 2013/0179037 A1* | 7/2013 | Ebihara et al. ...... B62D 5/0481 701/41 |
| 2013/0311044 A1* | 11/2013 | Tamaizumi et al. ..... B62D 6/08 701/42 |

FOREIGN PATENT DOCUMENTS

| | | | |
|---|---|---|---|
| EP | 2426030 A1 | 3/2012 | |
| JP | H09-39809 A | 2/1997 | |
| JP | WO2012133590 A1 * | 10/2012 | ............... B62D 6/08 |
| WO | 2012/035418 A1 | 3/2012 | |

OTHER PUBLICATIONS

May 6, 2015 Written Opinion issued in International Patent Application No. PCT/FR2015/050473.

* cited by examiner

DETECTION METHOD OF A STEERING REVERSAL BY MONITORING OF THE TORQUE PROVIDED BY A STEERING ASSIST MOTOR AND APPLICATION OF SAID METHOD FOR EVALUATING THE FRICTION

The present invention concerns the general field of the methods for managing power steering equipping vehicles, and in particular motor vehicles.

It concerns more particularly taking into consideration the friction forces in a power steering mechanism.

BACKGROUND

In some power steering management methods, and more generally in certain methods for controlling the path of a vehicle, it may be useful, or even essential, to detect a steering reversal, that is to say a change of the rotation direction of the steering wheel under the action of the driver of the vehicle.

For this purpose, it is possible to monitor the rotation angular speed of the steering wheel, in order to detect a change in sign of said rotation speed.

However, in order to allow a sufficiently reliable detection of a steering reversal by such a method, and more particularly in order to prevent the generation of false positives caused for example by slight oscillations of the steering wheel, it is necessary to ensure that the amplitude of the angular displacements made by said steering wheel, in each of the two opposite rotation directions which border the steering reversal point, is greater than some predetermined, relatively high, detection thresholds.

However, the time required for the steering wheel to reach and cross such detection thresholds may be relatively long, which tends to limit the accuracy and the reactivity of method for detecting the steering reversals.

Furthermore, the need to know the angular speed of the steering wheel, for example from a measurement of the angular position of said steering wheel may, in some situations, impose adding a dedicated sensor, which increases the size and the weight of the steering system and the cost for the manufacturing thereof.

BRIEF SUMMARY

The objects assigned to the invention are reached by a means of a method for managing a power steering, said power steering comprising at least one assist motor intended to output an assistance force, said method being characterized in that it comprises a steering reversal detection step (a) during which a signal called "motor torque signal", which is representative of the assistance force output by the assist motor is acquired, then the time derivative of said motor torque signal is evaluated, then said time derivative of the motor torque signal is compared to a predetermined variation threshold in order to detect a derivative peak, greater than said predetermined variation threshold, which indicates a reversal of the steering direction of the power steering.

Advantageously, the monitoring of a signal representative of the assistance force provided by the assist motor, for example of a signal which corresponds to the torque setpoint applied to said assist motor or to the actual measurement of the torque which is exerted by the shaft of said assist motor on the steering mechanism, and more particularly the monitoring of the instantaneous value taken by the time derivative of such a signal, makes it possible to quickly and reliably detect any steering reversal, regardless of the use of restrictive detection thresholds relating to the amplitude of the angular displacement of the steering wheel.

Indeed, the inventors have found that, during a steering reversal, that is to say when the driver successively swerves to the left, then swerves to the right (or vice versa), a very fast, almost instantaneous drop (in absolute value) of the assistance (torque) force output by the assist motor is observed, wherein said drop results in a peak of the time derivative of the signal that is representative of said assistance (torque) force.

This sudden variation of a high amplitude of the assistance force results from the fact that, when the steering system, and more particularly the assist motor, operates, when being at an displacement (local) extremum of the steering members (that is to say when undergoing a steering reversal), a transition from a first assistance state in which the assist motor assists the steering maneuver in a first direction (form example to the left) to a second assistance state in which the motor assists the steering maneuver in a second opposite direction (to the right in the aforementioned example), a switching (a reversal) of the displacement direction of steering members is necessarily observed.

Now, in practice, the resistant forces due to the inner frictions to the steering mechanism, which tend to oppose the steering maneuver, are of opposite sign to the sign of the displacement (and more particularly to the sign of the displacement speed) of the steering members.

The assistance force has, for its part, in fine, a driving function, that is to say, that said assistance force tends to drive in displacement the steering members in the considered steering direction, desired by the driver, against the resistant forces, including the forces due to the inner frictions.

In any case, the switching of the maneuver direction of the steering angle, and thus the switching of the displacement direction of the steering members, causes almost simultaneously, on the one hand the disappearance of a first resistant force component, attributable to the frictions which oppose, before the steering reversal, the displacement of the steering members in the first direction (by convention to the left), and on the other hand the appearance of a new (second) resistant force component, also attributable to the frictions, but opposite in sign to the first resistant force component, and which opposes this time, after the steering reversal, the displacement of the steering members in the second direction (to the right) opposite to the first direction.

The presence of frictions, and more particularly the reversal of the action direction of frictions when reversing the steering direction, results in a hysteresis phenomenon which manifests, during the reversal of the steering direction, as a drop (in absolute value) of the resistant force, and consequently as a drop of the assistance force which is output by the assist motor to counter (and overcome) said resistant force.

Practically, said drop corresponds more precisely to the accumulation (the algebraic accumulation, by taking into account the opposite signs) of the first resistant force component (first friction force component) and the aforementioned second resistant force component (second friction force component).

The calculation of the time derivative of the motor torque signal thus advantageously allows highlighting any rapid drop of said motor torque signal attributable to a steering reversal, and consequently, detecting said steering reversal.

It will be also advantageously noted that the monitoring of the time derivative of the motor torque signal, besides providing a rapid detection of the steering reversals, facilitates, as it will be detailed hereinafter, the filtering operations enabling eliminating the risks of false positives due to the noise affecting the quality of the motor torque signal.

Finally, the motor torque signal advantageously constitutes a signal which is systematically available and which may be easily exploited within all power steering systems, for example in the form of the setpoint which is developed by the assistance laws and applied to the assist motor, thereby simplifying the implementation of the invention.

BRIEF DESCRIPTION OF THE DRAWINGS

Other objects, features and advantages of the invention will further appear in detail on reading the following description, as well as using the appended drawings, provided by a purely illustrative and non-limiting way, in which.

DETAILED DESCRIPTION

The invention concerns a method for managing a power steering 1.

Said power steering 1 comprises at least one assist motor 2 intended to output an assistance force $C_{assist}$.

It is possible to indifferently consider any type of assist motor 2, more particularly any type of bi-directional assist motor.

In particular, the invention can as well be applied to a rotary assist motor 2 intended for exerting a torque type assistance force $C_{assist}$ as to a linear assist motor 2 intended for exerting a traction or compression type assistance force $C_{assist}$.

Furthermore, said assist motor 2 can be for example hydraulic, or, preferably, electric (using an electric motor makes in particular easier implanting and implementing said motor, as well as generating and managing the useful signals).

In a particularly preferred manner, the assist motor 2 will be a rotary type electric motor, for example of the brushless type.

Furthermore, the power steering 1 preferably comprises, in a known per se manner (but not shown), a steering wheel by which the driver of the vehicle can drive in rotation a steering column which engages, by means of a pinion, on a steering rack slidingly mounted in a steering casing secured to the chassis of the vehicle.

The ends of the steering rack are preferably each connected to a yaw steerable stub axle, on which a steered (and preferably driving) wheel of the vehicle is mounted, so that the displacement of the rack in translation in the casing causes a modification in the steering angle (that is to say the yaw orientation) of said steered wheels.

The assist motor 2 may engage the steering column, for example through a worm wheel and worm reducer, or even directly engage the steering rack by a ball screw type driving mechanism or via a driving pinion separate from the pinion of the steering column (thus forming a steering mechanism called "dual pinion mechanism".

Figure 4:
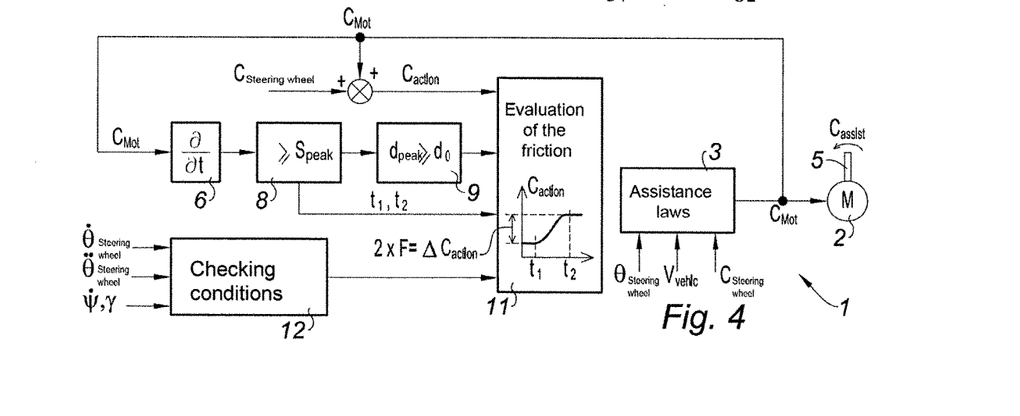
FIG. 4 illustrates, in a block diagram, the operation of a method in accordance with the invention.

As illustrated in FIG. 4, the force setpoint (or, more preferably, the torque setpoint) $C_{Mot}$ which is applied to the assist motor 2 so that said motor assists the driver in maneuvering the steering system 1 depends on predetermined assistance laws, stored in a non-volatile memory of a calculator (herein an application module of assistance laws 3), wherein said assistance laws may adjust said force setpoint $C_{Mot}$ depending on various parameters such as the steering wheel torque $C_{steering\ wheel}$ exerted by the driver on the steering wheel, the (longitudinal) speed $V_{vehic}$ of the vehicle, the angular position $\theta_{steering\ wheel}$ of the steering wheel, etc.

According to the invention, the method comprises a steering reversal detection step (a).

This steering reversal detection step (a) allows detecting a steering reversal 4, that is to say a change in the direction in which the driver of the vehicle (voluntarily) actuates the steering wheel, wherein this change aims at and has the effect of switching from a steering position to the left, in which the driver exerts a force which pulls the steering wheel to the left, to a steering position to the right, in which the driver exerts a force which pulls the steering wheel to the right, or vice versa.

Figure 1:
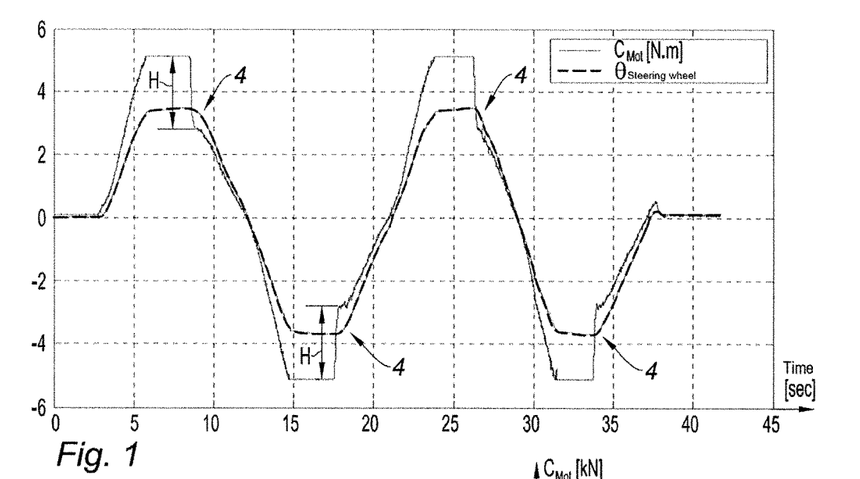
FIG. 1 illustrates, in a time diagram, the evolution of the angular position of the steering wheel (or, equivalently, by taking into account the reduction ratio of the driving mechanism, the evolution of the angular position of the shaft of the assist motor) as well as the evolution of the motor torque signal during some successive steering reversals.

Such successive steering reversals 4 are clearly visible in FIG. 1, in which the dotted line curve illustrates the evolution over the time of the angular position $\theta_{steering\ wheel}$ of the steering wheel, thus making the alternations of the steering wheel of rotation direction of said steering wheel appear, when the driver successively steers the steering wheel to the right, then to the left, then to the right again, etc. (which explains that the curve representative of the angular position of the steering wheel herein has a shape similar to a sinusoid).

It will be noted that, in the preferred example of FIG. 1, the angular position $\theta_{steering\ wheel}$ of the steering wheel, representative of the steering angle configuration, is actually expressed in an equivalent manner from the angular position of the shaft 5 of the assist motor 2.

Indeed, any position measurement representative of the spatial configuration of the steering angle, and consequently the angular position of the steering wheel, may be appropriate for the purposes of illustration and implementation of the invention.

In this case, the mechanical reduction ratio of the kinematic linkage which connects the shaft 5 of the assist motor to the steering wheel establishes a relationship between the angular position of the shaft of the motor and the angular position of the steering wheel.

In the example of FIG. 1, the reduction ratio being about 26, and the angle scale put on the ordinate corresponding to the mechanical kilo-degrees ($10^3$ degrees) of the drive shaft, the back and forth movements of the drive shaft alternate between $-3600°$ degrees (of drive shaft angle) and $3600°$ degrees (of drive shaft angle) approximately, which corresponds to the angular displacements of the steering wheel by about $+/-139$ degrees.

It will be also noted that, in a known per se manner, the information of angular position of the shaft 5 of the assist motor 2 may be provided by a relative position sensor, of the resolver type, herein advantageously integrated in series with the assist motor 2.

This measurement choice of the angular position, a choice which is not restrictive relative to the principle of the invention, explains that it is also possible, if required, to initially express said angular position in an electric degree type unit, which takes into account the number of stator poles of the resolver, rather than in mechanical degrees.

According to the invention, during the steering reversal detection step (a), one acquires a signal called "motor torque signal", which is representative of the assist force $C_{assist}$ output by the assist motor 2 (and more particularly representative of the torque, in this case the electromagnetic torque, provided by said assist motor).

Preferably, the motor torque signal used for the steering reversal detection step (a) is constituted by the force or torque setpoint $C_{Mot}$ which is applied to the assist motor 2, or even by a measured value of the force or the torque $C_{assist}$ which is actually output from the assist motor 2.

In practice, in the life situations considered for the vehicle, the value of the setpoint $C_{Mot}$ applied to the assist motor 2, and the value of the assist force $C_{assist}$ which is actually provided by said assist motor 2, are extremely close, or even equal, so that these two signals may be used in an equivalent manner within the framework of the invention.

That is why, preferably, and for convenience of description, it will be possible to assimilate in the following the motor torque signal to the force setpoint (torque setpoint) $C_{Mot}$ applied to the assist motor 2.

Furthermore, it will be noted that the force setpoint $C_{Mot}$ signal and/or the assistance force measurement $C_{assist}$ signal that is actually output by the motor have the advantage of being available and may be easily used within the power steering.

In particular, the force setpoint signal $C_{Mot}$ intended to be applied to the assist motor is necessarily permanently known, since said signal systematically constitutes an output data from the application module that applies the assist laws 3 of the power steering.

Exploiting this setpoint signal $C_{Mot}$ therefore requires only a very simple implementation.

The information relating to the measurement of the assistance force $C_{assist}$ (or torque) actually output by the assist motor 2 may, for its part, be given, if required, by said assist motor 2 itself (or more particularly by the controller integrated to said motor), if said assist motor is equipped in series by a force sensor, and more particularly by a suitable electromagnetic torque sensor.

The measurement of the assist force $C_{assist}$ may of course be, alternatively, obtained by any other appropriate outer force (or torque) sensor, such as a torque sensor attached on the shaft 5 of the assist motor 2.

According to a possible variant of implementation of the method, it will be possible to consider as motor torque signal, representative of the assistance force $C_{assist}$ output by the assist motor 2, the traction or compressive force exerted (longitudinally, along the axis of translation of said rack) on the steering rack.

Such a signal might be for example provided by the strain gauges measuring the deformations of the rack, or by any other appropriate force sensor.

Generally, for the (mere) detection of the steering reversals according to the invention, it is indeed possible to exploit, as a motor torque signal, any signal whose value is sensitive to a reversal of frictions, that is to say any signal whose value is affected by all or part of the (inner) frictions which are exerted on the steering system so that said signal undergoes a perceptible variation (herein a drop) during the steering reversal (and consequently during the reversal of said frictions).

Furthermore, it will be noted that, taking into account the drive ratio between the assist motor 2 and the steering rack, it is possible to indifferently express the motor torque signal $C_{Mot}$ in the form of a motor torque or in the form of a rack equivalent linear force, without modifying the general principle of the invention.

Figure 2:
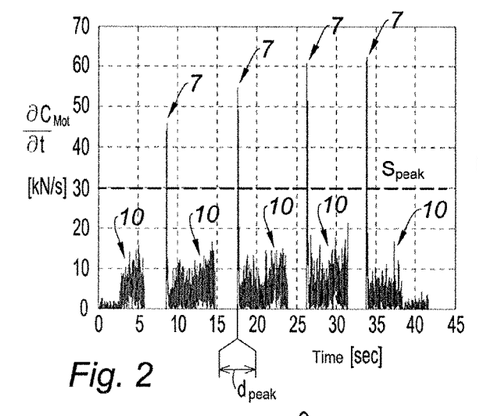
FIG. 2 illustrates, in a time diagram, the values taken by the time derivative of the motor torque signal of FIG. 1.
Figure 3:
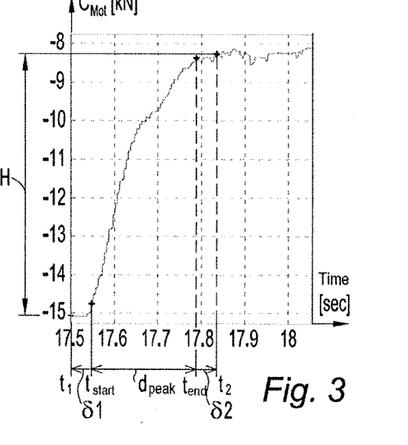
FIG. 3 illustrates, according to a time diagram, an enlarged view of the curve representing the torque signal of FIG. 1, at the moment of the torque drop (in absolute value) caused by a steering reversal.

Thus, by way of example, the motor torque signal $C_{Mot}$ of FIG. 1, which is homogeneous with a torque (expressed in N·m) in said FIG. 1, may thus be converted, for convenience of representation and by mere convention, in the form of an equivalent linear force, expressed in Newtons, and more accurately in kilo-Newtons, as shown in FIG. 2 or FIG. 3.

Furthermore, although it is not excluded to work with analog signals, in particular an analog motor torque signal $C_{Mot}$, there will be preferably used one or more digital signal(s), and in particular a digital motor torque signal $C_{Mot}$.

According to the invention, after having acquired the motor torque signal $C_{Mot}$, the time derivative $$\frac{\partial C_{Mot}}{\partial t}$$

of said motor torque signal is evaluated (herein by means of the derivative module 6 in FIG. 4).

In practice, it is possible to apply, for this purpose, any derivation method that enables determining the variation of the motor torque signal $C_{Mot}$ per time unit (that is to say the slope of the curve representing said signal), for instance between two instants separated by a predetermined sufficiently limited time interval (sampling period).

For information, said sampling period (also called "sampling interval") might be comprised between 0.5 ms and 10 ms.

After having evaluated the time derivative of the motor torque signal, said time derivative of the motor torque signal $$\frac{\partial C_{Mot}}{\partial t}$$

is then compared, herein by means of a comparison module 8, to a predetermined variation threshold $S_{peak}$ in order to detect a derivative peak 7, which is greater than said predetermined variation threshold, and which indicates a reversal of the steering angle direction.

As said hereinabove, and as it is clearly visible in FIG. 1, a steering reversal 4 manifests, due to the concomitant reversal of the frictions, in a variation, in this case a drop (of the value becoming closer to zero), in absolute value, of the motor torque signal $C_{Mot}$.

Said drop has a relatively significant height H (in the range of 2.5 N·m of motor torque in the example of FIG. 1) and a relatively short duration (typically lower than half a second and for example comprised between 100 ms and 300 ms).

Said drop is therefore distinguishable by a steep slope setback of the motor torque signal $C_{Mot}$, clearly visible in FIG. 1, and thus manifests as a significant and sudden increase of the value of the time derivative of the motor torque signal $$\frac{\partial C_{Mot}}{\partial t},$$

in the form of a derivative peak 7, as illustrated in FIG. 2.

The inventors have thus found that the steering reversals 4 are indicated by derivative peaks 7, which may be identified since they have a value greater than a slope threshold value, called "variation threshold", $S_{peak}$, that is to say that said derivative peaks satisfy:

$$\frac{\partial C_{Mot}}{\partial t} \geq S_{peak}.$$

Typically, in particular in the example in FIG. 2, the time derivative peaks 7 of the motor torque signal (or more particularly, the peaks of the time derivative of the equivalent force exerted on the rack) that are characteristic of a steering reversal 4 were comprised in a range called "peak range" greater than 30 kN/s, and in this case ranging from 30 kN/s to 65 kN/s, and more particularly from 35 kN/s to 50 kN/s.

The predetermined variation threshold $S_{peak}$ may be consequently selected as lower than or equal to the expected peak range, and in particular may be equal to or close to the lower limit of said range. For example, the peak variation threshold $S_{peak}$ might be herein set at 30 kN/s.

According to a preferred possibility of implementation which may constitute an invention in its own right, during the steering reversal detection step (a), in this case by using a filtering module 9 in FIG. 4, a peak selective filtering is carried out by timing the duration $d_{peak}$ called "peak holding duration", during which the time derivative of the motor torque signal $$\frac{\partial C_{Mot}}{\partial t}$$

is held above the threshold variation $S_{peak}$, after having crossed said variation threshold $S_{peak}$, and by indicating a steering reversal 4 if the peak holding duration is greater than or equal to a predetermined minimum duration threshold $d_{peak}$.

In other words, it is concluded that there is a steering reversal 4 if the time derivative of the motor torque signal satisfies the double condition, on the one hand of crossing a variation threshold $S_{peak}$ (that is to say said time derivative of the motor torque signal has a value greater than a minimum slope value, as described hereinabove) and, on the other hand, of holding above said variation threshold $S_{peak}$ for a duration at least equal to the aforementioned duration threshold $d_0$.

Advantageously, the filtering is an additional precaution in the identification of the steering reversals 4, insofar as said filtering allows distinguishing between the derivative peaks 7 which truly corresponds to steering reversals 4 and noise derivative peaks 10 (FIG. 2) which are caused by the background noise which interferes with the motor torque signal $C_{Mot}$.

Indeed, since the noise creates random and rapid fluctuations within the motor torque signal $C_{Mot}$, it is not excluded that, occasionally, said noise causes a variation (slope) appear in said signal, wherein said variation would be greater than the variation threshold $S_{peak}$, and might thus be misinterpreted as a steering reversal, should the interpretation be solely based on the first detection criterion that consists in calculating the time derivative.

However, the inventors have found that the noise, that is a substantially periodic phenomenon, had a characteristic half-period which is strictly lower than the drop duration of the motor torque signal.

Since the duration of the noise derivative peaks caused by the noise is substantially equal to the half-period of said noise (half-period during which the noise monotonically increases, or conversely, monotonically decreases, between the minimum and the maximum of the respective oscillation or vice versa), it is therefore possible to isolate the relevant derivative peaks 7 representative of an actual steering reversal, by excluding, according to a second criterion complementing the first criterion, the (noise 10) derivative peaks which have a duration strictly lower than the characteristic duration of such a steering reversal 4.

In this case, one may for example set the minimum duration $d_0$ threshold at a value comprised between 30 ms and 40 ms, which corresponds to the maximum half-period typical of the observed noise (while the duration of drop caused by a steering reversal is equal to or greater than 100 ms).

Concretely, the filtering module 9 may include a peak detection latch, which is placed under the double dependence, on the one hand, of the comparison module 8, and on the other hand, of a clock that measures the time elapsed from the instant when said comparison module 8 has detected the crossing of the variation threshold $S_{peak}$, so that said latch returns a detection signal (peak identification signal) as soon as the two cumulative conditions are combined to confirm that there is a steering reversal peak 7.

Furthermore, according to a preferred possibility of implementation which may constitute an invention in its own right, regardless of the nature of the steering reversal detection step (a), the method according to the invention may comprise a friction evaluation step (b) comprising acquiring a signal $C_{action}$, called "actuation force signal", which is representative of the total actuation force (and more particularly of the total actuation torque) jointly exerted on the power steering by the driver and by the assist motor, and evaluating the friction force F which opposes the steering movements of the power steering, by means of a friction evaluation module 11, from the difference $\Delta C_{action}$ between two values taken by said actuation force signal $C_{action}$ respectively before and after the steering reversal 4.

In other words, the method comprises a friction evaluation step (b) during which the friction is evaluated from the drop $\Delta C_{action}$ of the actuation force signal $C_{action}$ which occurs during the steering reversal detected by the step (a).

Indeed, for the same reasons as detailed hereinabove in order to explain the drop H of the motor torque signal $C_{Mot}$ in case of steering reversal, a steering reversal 4 also results, more generally, in a drop $\Delta C_{action}$ of the actuation force signal $C_{action}$, due to the reversal of the sign of the friction forces.

In absolute terms, it might furthermore be possible, in a substantially equivalent manner, and without altering the principle of the invention, to evaluate the friction F from the motor torque signal $C_{Mot}$ alone (as said signal is provided by the setpoint applied to the motor, or by the electromagnetic torque output by the motor, as mentioned hereinabove), and more particularly from the difference between two values taken by said motor torque signal $C_{Mot}$ alone (rather than by the total actuation force signal $C_{action}$), respectively before and after the steering reversal, that is to say from the height of drop H already mentioned hereinabove.

However, in order to obtain a more accurate and more complete evaluation of the friction phenomenon which affects the steering system, it is preferable to use, for calculating the height of drop, a signal which encompasses the friction effects on a kinematic linkage which is as long and as complete as possible, within the steering system, and this, in order to take into account the largest possible number of steering system segments in which the frictions may arise and consequently to neglect the least possible inner friction sources.

In other words, it is preferred to collect signals of forces in areas that are located as far upstream as possible of each kinematic linkage comprised between an upstream actuator element of the steering system (namely the driver and the assist motor respectively) on the one hand, and the downstream effecting members (tie rods and steered wheels) on the other hand, so that these signals encompass the maximum of frictions which oppose the maneuver of the steering, and for instance encompass all the frictions which arise throughout the kinematic linkage downstream of the one or more concerned actuator(s).

Furthermore, it is also preferable to consider a total actuation force signal, which takes into account not only the contribution of the assist motor 2, but also the manual contribution of the driver.

Indeed, the drop (in absolute value) of such an actuation force signal is thus representative of the frictions which affect the steering mechanism both in the "motorized" portion thereof (assist motor, reducer, rack . . . ) and in (all or part of) the "manual" portion thereof, also called "driver" portion (steering wheel, steering column, pinion/rack connection . . . )

For these reasons, the actuation force signal $C_{action}$ is preferably formed, as illustrated in FIG. 4, by the sum, on the one hand, of a steering wheel torque signal representative of a steering wheel torque $C_{steering\ wheel}$ exerted by the driver on the steering wheel, and on the other hand, of the motor torque signal $C_{Mot}$.

Advantageously, it will be noted that the steering wheel torque $C_{steering\ wheel}$ and motor torque $C_{Mot}$ signals are already available at any instant within the most of power steering systems, and may be thereby easily exploited, which simplifies the implementation of the invention.

The steering wheel torque signal $C_{Mot}$ might for example correspond to a measurement of the steering wheel torque $C_{steering\ wheel}$ obtained by an appropriate steering wheel torque sensor, such as a magnetic torque sensor measuring the elastic deformations of a torsion bar positioned between the steering wheel and the steering column.

Such a steering wheel torque signal $C_{Mot}$ allows advantageously taking into consideration all frictions appearing downstream of said torsion bar, and in particular the frictions arising in the connection between the rack and the pinion that is fastened to the lower segment of the steering column.

The motor torque signal $C_{Mot}$ adapted for this application might be, for its part, obtained by any appropriate means described hereinabove.

As such, it will be noted that when the motor torque signal $C_{Mot}$ is intended to quantify the height of drop (during the friction evaluation step (b)), and not only to detect the steering reversals (during the detection step (a)), and this, irrespective of the fact that said motor torque signal $C_{Mot}$ is used either alone or in combination with the steering wheel torque signal to form the total actuation force signal $C_{action}$, said motor torque signal $C_{Mot}$ will be preferably collected as far upstream as possible relative to the assist motor 2, and will therefore preferably consist of the setpoint applied to said assist motor, or of the measurement of the electromagnetic torque which is output by said assist motor, as said hereinabove.

Furthermore, regardless of the signal used to quantify the frictions (motor torque signal $C_{Mot}$, or, preferably, actuation signal $C_{action}$), the evaluation of the friction requires extracting from said signal the values taken by said signal immediately before and immediately after the steering reversal, that is to say, more particularly, immediately before and immediately after the derivative peak 7, and this, in order to calculate then the difference (height of drop) between said two values.

That is why the method in accordance with the invention will preferably use a database that makes it possible storing in a memory the history of the different values that are successively taken by the signal which is used to quantify the frictions (motor torque signal $C_{Mot}$, or, preferably, actuation signal $C_{action}$) over a record period which will be selected higher than the expected duration of the drops related to the steering reversals 4.

Thus, it might be possible, after a derivative peak 7 has been identified, to go back over history of the signal so as to know the value of said signal at an instant which precedes the occurrence of said derivative peak.

Advantageously, in order to avoid unnecessary consumption of the memory space, the database will be constantly refreshed, over a rolling record period, so as to keep, at a considered instant, only the information which may effectively be useful for calculating the friction at said considered instant.

For information, the record period might be comprised between 0.5 s (500 ms) and 1 s, and preferably equal to 500 ms.

Preferably, and as illustrated in FIGS. 3 and 4, the friction evaluation step (b) comprises identifying a peak start instant $t_{start}$, which corresponds to the instant at which the time derivative of the motor torque signal $$\left(\frac{\partial CMot}{\partial t}\right)$$

passes above the variation threshold $S_{peak}$, identifying a peak end instant $t_{end}$, which corresponds to the instant at which the time derivative of the motor torque signal $$\left(\frac{\partial CMot}{\partial t}\right)$$

goes down below said threshold variation $S_{peak}$, then determining what was the value $C_{action}$ (t1), called "actuation force value prior to the steering reversal", that was taken by the actuation force signal at a first reference instant t1 which is equal to or prior to the peak start instant $t_{start}$, determining what was the value $C_{action}$(t2), called "actuation force value subsequent to the steering reversal", that was taken by the actuation force signal at a second reference instant t2 which is equal to or subsequent to the peak end instant $t_{end}$, then evaluating the friction from calculating the difference between the actuation force value subsequent to the steering reversal $C_{action}$(t2) and the actuation force value prior to the steering reversal $C_{action}$(t1), that is to say:

$$\Delta C_{action} = |C_{action}(t2) - C_{action}(t1)|.$$

More particularly, it might be considered that the value of the friction forces F which affect the maneuver of the steering system at the considered instant (that is to say, at the moment of the considered steering reversal 4) is equal, taking into account the hysteresis phenomenon mentioned hereinabove, to the half-difference between the actuation force value subsequent to the steering reversal and the actuation force value prior to the steering reversal, that is to say: $F=\Delta C_{action}/2$.

Advantageously, using a time derivative of the motor torque signal $C_{Mot}$ as well as a time reference referring to the derivative peak 7 start $t_{start}$ and end $t_{end}$ instants which are identified from said derivative makes it possible to accurately detect the moment when the steering reversal 4 occurs, and thus to improve the reliability and the accuracy of the evaluation of the features of the drop of the actuation force signal.

By measuring the actuation force at reference instants t1, t2 which are calculated from the peak start and end instants and which frame as close as possible the actual steering reversal 4 (and consequently the drop of the actuation force signal), the invention allows accurately determining what was the exact value of the actuation force $C_{action}$ right before and right after said steering reversal.

Any delay or approximation in the measurement, which might otherwise lead to consider a value of the actuation signal which is not representative of the actual height of drop, since said value is measured at a measurement point temporally too far from said drop, is thus avoided.

The invention thus makes it possible to evaluate the friction F in a reactive and reliable manner, since said invention considerably reduces the sources of errors and slowness, which marred so far the friction estimation methods based on a monitoring of the angular position of the steering wheel.

According to one possibility of implementation, one may choose to arbitrarily match the first reference instant t1 with the peak start instant $t_{start}$ (that is to say to set $t1=t_{start}$), and/or, complementarily or alternatively, select to match the second reference instant t2 with the peak end instant $t_{end}$ (that is, to write out $t2=t_{end}$).

However, according to a second possibility, the first reference instant t1 is preferably selected strictly prior to the peak start instant $t_{start}$ ($t1<t_{start}$), said first reference instant preceding said peak start instant by an advance value δ1 (that is to say: $t1=t_{start}-\delta 1$) and/or the second reference instant t2 is selected strictly subsequent to the peak end time ($t2>t_{end}$), said second reference instant following said peak end instant by a delay value δ2 (that is to say: $t2=t_{end}+\delta 2$).

For information, the advance value δ1 is preferably comprised between 20 ms and 100 ms, and for example substantially equal to 50 ms (fifty milliseconds).

For information, the delay value δ2 is preferably comprised between 20 ms and 100 ms, and for example substantially equal to 50 ms (fifty milliseconds).

In other words, the time interval [t1; t2] on which the height of drop $\Delta C_{action}$ of the considered signal (herein the actuation force signal) is calculated, is preferably widened and this, preferably on both sides, both in delay as well as in advance.

This widening of the measurement interval with respect to the gross interval defined by the peak start and end instants, wherein said widening preferably represents at least 10 ms (in advance as well as in delay), and for preferential example 50 ms (in advance as well as in delay: δ1=δ2=50 ms), allows ensuring that the elapsed duration (that is to say, t2−t1) between the first reference instant t1 and the second reference instant t2 is actually greater than or equal to (and, if appropriate right greater) the actual duration of the (complete) drop of the signal attributable to the steering reversal, and therefore attributable to the friction.

Thus, the method in accordance with the invention allows guaranteeing that the extreme values of the actuation force signal which correspond to the entire height of drop of said signal, characteristic of the steering reversal, are well measured without truncating a part of said drop.

Furthermore, the advance δ1 and delay δ2 values remain, however, relatively lower than some predetermined maximum widening thresholds, selected such that the first reference instant t1 and the second reference instant t2 remain in the immediate temporal vicinity of the transition domain (vicinity of the domain of the drop) due to the steering reversal, in "border" domains of said transition, border domains in which the value of the concerned signal remains almost constant with respect to the value which is taken by said signal at the transition limit (the evolutions of said value in the border domains being for example contained in an amplitude range lower than or equal to 10%, 5%, or even lower than or equal to 1% of the height of drop).

Herein, due to the fact that, outside the domain of the drop attributable to the reversal of the friction, the motor torque signal $C_{Mot}$, as well as the actuation force signal $C_{action}$, vary much more slowly than during said drop, the low widening provided (the advance δ1 and the delay δ2 being typically lower than 200 ms or even 100 ms, and preferably each equal to 50 ms) allows keeping the first reference instant t1 and the second reference instant t2 in the immediate temporal vicinity of the domain of the drop, in "border" domains of said drop, border domains in which the value of the concerned signal remains almost constant with respect to the value which is taken by said signal at the drop limit.

Thus, the measurements of the signal values taken at the first and second reference instant t1, t2, that is to say neither too early nor too late with respect with the drop attributable to the friction, accurately reflect the actual value of the actuation force $C_{action}$ (or respectively of the motor torque $C_{Mot}$) considered at the limits of said drop.

Ultimately, the method according to the invention therefore allows substantially measuring a height of drop which corresponds to the entire contribution specific to the friction and nothing but the contribution specific to the friction.

Accordingly, said method advantageously enables obtaining, almost in real-time, a reliable, accurate, and regularly updated measurement, of the actual friction F which affects the steering system at the concerned instant, whereas the known methods, which were based on a quite coarse approximation of the friction, made from pre-established theoretical models of friction, were not able to do so.

It will be noted that, according to a variant of implementation of the invention, instead of calculating the first and the second reference instants t1, t2 respectively from the peak start instant $t_{start}$ and the peak end instant $t_{end}$, it might be possible to characterize the derivative peak 7 by a single peak instant, which may correspond for example to the peak start instant, or the peak end instant, or the average instant located in the middle of said peak start and end instants, and then to arbitrarily set the first and second reference instants t1, t2 on either side of said single peak instant, so as to encompass in the interval thus defined the expected characteristic duration of the drops of signal; for example, it might be possible to consider that the first reference instant is located 100 ms before the single peak instant, and the second instant 200 ms after said single peak instant.

Of course, this choice of reference instants t1, t2 does not affect the general principle of evaluation of the friction described hereinabove.

Moreover, regardless of the definition used for the first and the second reference instants t1, t2, the record period of the actuation force signal $C_{action}$ (and/or motor torque signal $C_{Mot}$), which allows temporarily keeping in memory the values of said signal which are useful for evaluating the friction at the considered instant, will be, of course, greater than the width of the time interval [t1; t2] comprised between said first and second reference instants, and, more particularly, greater than the expected maximum duration of drop increased by the delay δ2 and the advance δ1.

Furthermore, the method according to the invention preferably comprises a verification step (c), during which one checks, herein within a verification module 12 in FIG. 4, whether one or more condition(s) of implementation among the following conditions is(are) satisfied, preferably in a cumulative manner: the speed of rotation of the steering wheel $\dot{\theta}_{steering\ wheel}$ is lower than or equal to a predetermined steering wheel speed threshold $\dot{\theta}_{steering\ wheel\ threshold}$, the angular acceleration of the steering wheel $\ddot{\theta}_{steering\ wheel}$ is lower than or equal to a predetermined steering wheel acceleration threshold $\ddot{\theta}_{steering\ wheel\ threshold}$, the evolution of the yaw rate $\dot{\psi}$ of the vehicle or the evolution of the lateral acceleration γ of the vehicle as a function of the orientation angle of the steering wheel $\theta_{steering\ wheel}$ lies within a substantially linear domain.

The condition dealing with the speed of rotation of the steering wheel $\dot{\theta}_{steering\ wheel}$, which must be lower than or equal to a steering wheel speed threshold $\dot{\theta}_{steering\ wheel\ threshold}$ that is close to zero, and for example about 5 deg/s, allows verifying that the life situation of the vehicle position is compatible with a steering reversal, by ensuring that the angular speed of the steering wheel lies in the vicinity of zero at the moment of the presumed steering reversal.

Indeed, during an actual steering reversal, the steering wheel speed becomes necessarily zero at the reversal point (cusp) of the steering wheel. Conversely, the absence of crossing zero of the speed of the steering wheel excludes the situation of steering reversal.

The condition dealing with the angular acceleration of the steering wheel allows, for its part, conducting the evaluation of the friction only when the acceleration of the steering wheel, and consequently the acceleration of the movements of the members of the steering mechanism, is low, for example lower than or equal to 100 deg/s², that is to say only when inertial forces are non-existent or negligible.

Thus, we make sure that, during the evaluation of the friction, the stress state of the steering mechanism, such that this stress state is perceived and quantified by measuring the motor torque $C_{Mot}$ and/or by measuring the actuation force $C_{action}$, is well representative of the friction phenomenon, and only the friction phenomenon, and is not distorted by the appearance of inertial forces.

The condition on the linearity of the evolution of the yaw rate $\dot{\psi}$ of the vehicle, or, equivalently, of the evolution of the lateral acceleration γ of the vehicle, depending on the orientation angle of the steering wheel $\theta_{steering\ wheel}$ is tantamount to make sure that the vehicle is not in a loss of grip situation, and more particularly either in an oversteering situation or an understeering situation.

Indeed, a loss of grip (loss of tires grip on the pavement) will cause a drop in the resistant force that the wheels and the tie rods exert on the rack, against the assist motor, which will consequently result in a corresponding decrease of the force output by the assist motor, wherein said decrease has no connection with the action of inner frictions F, and thus might distort the evaluation of those frictions F.

In order to check the condition of linearity, it might be possible in particular to use the empirical laws established during test campaigns and associating a corresponding maximum permissible yaw rate or a corresponding maximum permissible acceleration, in different life situations (dry weather, wet pavement, etc.), with each angular position of the steering wheel among a plurality of different predetermined angular positions of the steering wheel.

Accordingly, one can consider being in the linearity domain, that is to say in a life situation allowing a reliable evaluation of friction, if, in the angular position of the steering wheel (or, equivalently, the angular position of the shaft of the assist motor) measured at the considered instant, the yaw rate $\dot{\psi}$ or the lateral acceleration γ of the vehicle (which may be for example provided by the electronic stability control system ESP, or by the braking assistance system Anti-lock Braking System), is lower than the maximum permissible value.

Ultimately, the effective realization of the evaluation of the friction according to the invention may advantageously be subjected to the simultaneous realization of several conditions, in this case for example up to four conditions (or more), namely a condition dealing with the minimum holding duration of the derivative peak $d_{peak}$, a condition dealing with the angular speed of the steering wheel $\dot{\theta}_{steering\ wheel}$, a condition dealing with the angular acceleration $\ddot{\theta}_{steering\ wheel}$ of the steering wheel, and/or a condition dealing with the linearity of the lateral dynamics (yaw rate $\dot{\psi}$, or lateral acceleration γ).

Conversely, the absence of realization of any of these conditions may inhibit the evaluation of the friction, since said evaluation is deemed to be irrelevant in view of the life situation of the vehicle at the considered instant.

Such a checking redundancy enables excluding the doubtful cases, and thus keeping only the reliable evaluations of the friction, which significantly improves the robustness of the method in accordance with the invention in view of the different instabilities which might affect it.

Furthermore, the variation threshold $S_{peak}$ and/or, if appropriate, the peak holding minimum duration $d_0$ threshold of and/or the advance δ1 and delay δ2 values are preferably adjusted depending on the angular acceleration $\ddot{\theta}_{steering\ wheel}$ of the steering wheel.

In other words, the invention allows dynamically updating the setting used for detecting the steering reversals and/or the evaluation of the friction, depending on different parameters such as the angular acceleration $\ddot{\theta}_{steering\ wheel}$ of the steering wheel, and this, in order to optimize in each case the reliability and the reactivity of the method.

Indeed, it will be easily understood, for example, that the duration of drop of the motor torque signal $C_{Mot}$ (respectively of the actuation force signal $C_{action}$) is as far shorter, and the slope thereof (the time derivative thereof) as far higher as the maneuver of the steering wheel is fast.

Thus, for example, when the driver executes a rapid steering maneuver immediately followed by a countersteering maneuver, such that relatively high angular accelerations of the steering wheel apply on both side of the zero speed point that corresponds to the steering reversal, it is possible to increase the value of the variation threshold $S_{peak}$, in order to better remove the noise, while keeping the possibility of detecting a drop having a steep slope.

Alternatively or complementarily, it is also possible or even desirable, when the angular acceleration of the steering wheel increases, to reduce the peak holding minimum duration threshold $d_0$, in order not to risk excluding a peak which would be relatively short but nevertheless representative of a steering reversal.

Similarly, alternatively or complementarily, it is also possible to consider reducing, in this situation, the advance δ1 and/or delay δ2 values used to define the first and second reference instants t1, t2, at which the extreme values of the actuation force $C_{action}$ allowing estimating the height of drop are acquired.

Indeed, since the drop duration becomes shorter when maneuvering the steering wheel is faster, it is possible to frame the whole of the drop in a narrower time domain without risking truncating the height of drop.

Advantageously, reducing the minimum time threshold for holding peak $d_0$ and/or advance values δ1 and/or delay δ2 allows accelerating the execution of the method, and thus optimizing the reactivity thereof without adversely affecting the reliability thereof.

More generally, adapting in real time the detection of the steering reversals and/or the evaluation of the friction depending on the life situation of the vehicle and/or the dynamics of the steering wheel allows optimizing the performances of the method, and making the latter particularly versatile.

Of course, the invention also concerns as such a power steering management module which is structured or programmed for implementing a method according to either of the features and variants described hereinabove.

Said management module might comprise, and more particularly gather, possibly within the same casing, one and/or the other (and possibly all) modules for applying the assistance laws 3, for calculating the derivative 6, filtering 9, evaluating friction 11 and checking conditions 12 as described hereinabove.

Each of the aforementioned modules may be formed by an electronic circuit, an electronic board, a calculator (computer), a programmable controller, or any other equivalent device.

Each of the aforementioned modules may have a physical control structure, based on the wiring arrangement of its electronic components, and/or, preferably, a virtual control structure defined by computer programming.

Of course, the invention also concerns as such any data medium readable by a computer and containing computer program code elements that enable executing the method in accordance with the invention when said medium is read by a computer.

Finally, it will be noted that the method in accordance with the invention, which exploits signals which are generally available within the power steering, may be easily generalized to all power steering systems, including in retrofitting many already existing power steering systems, by simply reprogramming the calculator thereof.

Of course, the invention, is moreover not limited to the embodiments described hereinabove, those skilled in the art being in particular able to isolate or freely combine together either of the aforementioned features, or even to substitute equivalents.

The invention claimed is:

1. A method for managing a power steering, said power steering comprising at least one assist motor intended for outputting an assistance force ($C_{assist}$), said method comprising:
a steering reversal detection step (a) comprising:
applying a force or torque to the assist motor and acquiring a motor torque signal ($C_{mot}$), which is representative of the assistance force ($C_{assist}$) output by the assist motor, and then
evaluating a time derivative $$\left(\frac{\partial CMot}{\partial t}\right)$$

of said motor torque signal, and then
comparing magnitudes of derivative peaks of said time derivative of the motor torque signal to a predetermined variation threshold ($S_{peak}$), and
detecting a derivative peak having a magnitude greater than said predetermined variation threshold ($S_{peak}$) to indicate the reversal of the steering direction of the power steering.

2. The method according to claim 1 wherein the motor torque signal ($C_{Mot}$) used for the steering reversal detection step (a) consists of a force or torque setpoint which is applied to the assist motor, or a measured value of the force or the torque ($C_{assist}$) which is actually reproduced by the assist motor.

3. The method according to claim 1 wherein, during the steering reversal detection step (a), a selective peak filter is carried out by timing a peak holding duration ($d_{peak}$), during which the time derivative of the motor torque signal $$\left(\frac{\partial CMot}{\partial t}\right)$$

is held above the variation threshold ($S_{peak}$), after having crossed said variation threshold ($S_{peak}$), and by indicating the steering reversal if the peak holding duration ($d_{peak}$) is greater than or equal to a predetermined minimum duration threshold ($d_0$).

4. The method according to claim 1 wherein it comprises a friction evaluation step (b) comprising acquiring an actuation force signal ($C_{action}$) which is representative of a total actuation force jointly exerted on the power steering by the driver and by the assist motor, and evaluating a friction force (F) which opposes the steering movements of the power steering from a difference ($\Delta C_{action}$) between two values taken by said actuation force signal ($C_{action}$) respectively before and after the steering reversal.

5. The method according to claim 4 wherein the actuation force signal ($C_{action}$) is formed either
by the sum of a steering wheel torque signal representative of a steering wheel torque ($C_{steering\ wheel}$) exerted by the driver on the steering wheel, or
by the sum of the motor torque signal ($C_{Mot}$).

6. The method according to claim 4, wherein the friction evaluation step (b) comprises evaluating a peak start instant ($t_{start}$) which corresponds to the instant at which the time derivative $$\left(\frac{\partial CMot}{\partial t}\right)$$

of the motor torque signal passes over the variation threshold ($S_{peak}$), then determining what was an actuation force value prior to the steering reversal ($C_{action}$(t1)), taken by the actuation force signal at a first reference instant (t1) equal to or prior to a peak start instant ($t_{start}$), determining what was an actuation force value subsequent to the steering reversal ($C_{action}(t2)$), taken by the actuation force signal at a second reference instant (t2) equal to or subsequent to a peak end instant ($t_{end}$), and then evaluating the friction force (F) from calculating the difference ($\Delta C_{action}$) between the actuation force value subsequent to the steering reversal ($C_{action}(t2)$) and the actuation force value prior to the steering reversal ($C_{action}(t1)$).

7. The method according to claim 6 wherein the first reference instant (t1) is selected strictly prior to the peak start instant ($t_{start}$), said first reference instant preceding said peak start instant by an advance value ($\delta 1$), and/or in that the second reference instant (t2) is selected strictly subsequent to the peak end instant ($t_{end}$), said second reference instant following said peak end instant by a delay value ($\delta 2$).

8. The method according to claim 1, wherein it comprises a verification step (c), during which one checks whether one or more implementation conditions among the following conditions are satisfied: a rotation speed of a steering wheel ($\dot{\theta}_{steering\ wheel}$) is lower than or equal to a predetermined steering wheel speed threshold, an angular acceleration ($\ddot{\theta}_{steering\ wheel}$) of the steering wheel is lower than or equal to a predetermined steering wheel acceleration threshold, an evolution of the yaw rate ($\dot{\psi}$) of a vehicle or an evolution of the lateral acceleration of the vehicle ($\gamma$) as a function of an orientation angle of the steering wheel ($\theta_{steering\ wheel}$) lies within a substantially linear domain.

9. The method according to claim 1 wherein the variation threshold ($S_{peak}$) and/or, if appropriate, a minimum peak holding duration threshold ($d_0$) and/or an advance ($\delta 1$) and delay ($\delta 2$) values are adjusted depending on an angular acceleration $\ddot{\theta}_{steering\ wheel}$ of a steering wheel.

10. A structured or programmed power steering management module for implementing a method for managing a power steering, said power steering comprising at least one assist motor intended for outputting an assistance force ($C_{assist}$), said method comprising:
a steering reversal detection step (a) comprising:
applying a force or torque to the assist motor and acquiring a motor torque signal ($C_{Mot}$), which is representative of the assistance force ($C_{assist}$) output by the assist motor (2), and then
evaluating a time derivative $$\frac{\partial C_{Mot}}{\partial t}$$

of said motor torque signal, and then
comparing magnitudes of derivative peaks of said time derivative of the motor torque signal to a predetermined variation threshold ($S_{peak}$), and
detecting a derivative peak having a magnitude greater than said predetermined variation threshold ($S_{peak}$) to indicate the reversal of the steering direction of the power steering.

* * * * *